Nov. 25, 1941.          J. H. WILSON          2,263,960
POWER TRANSMISSION BELT
Filed Nov. 16, 1939
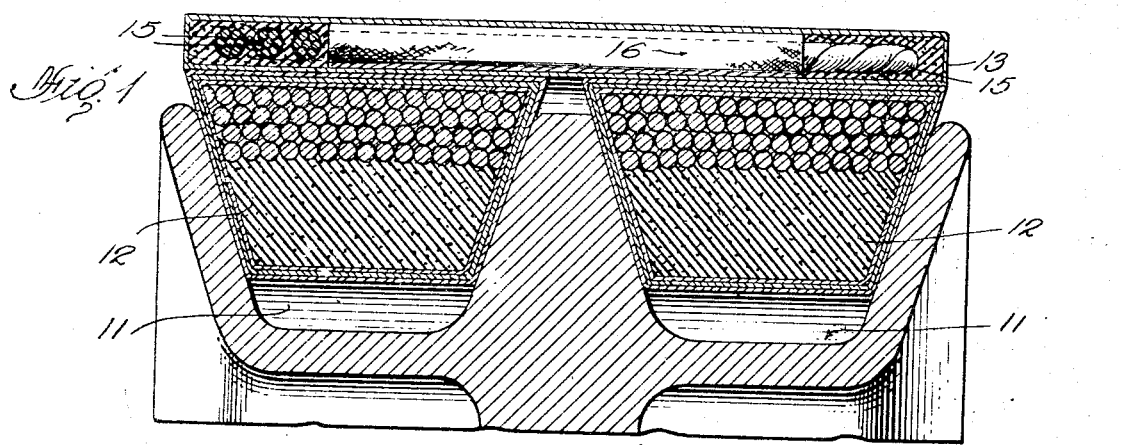
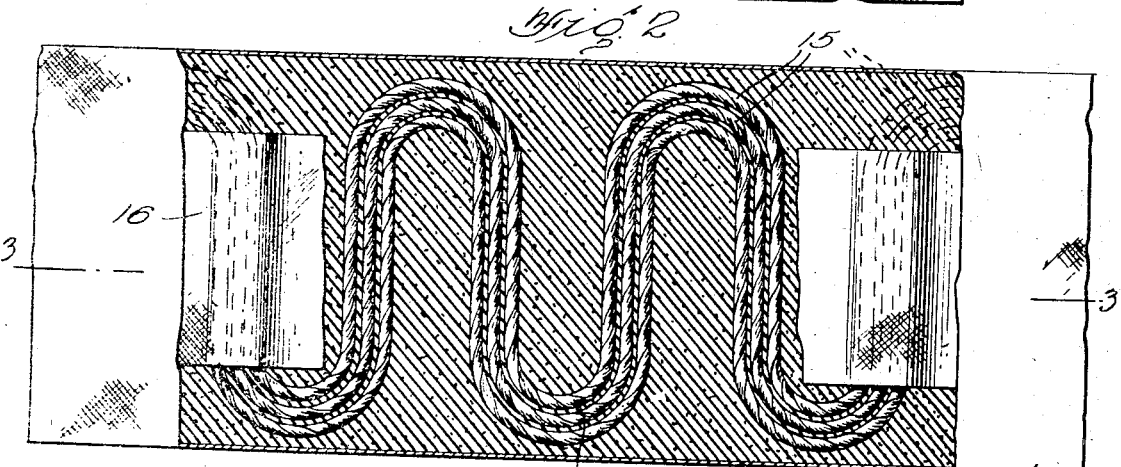
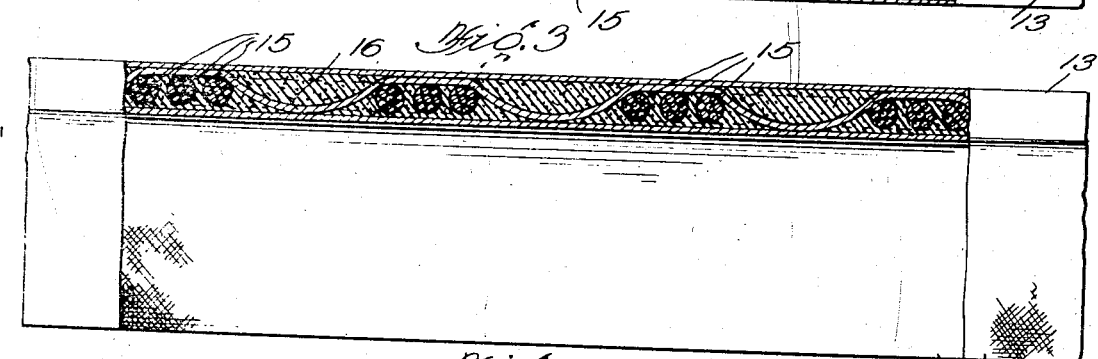
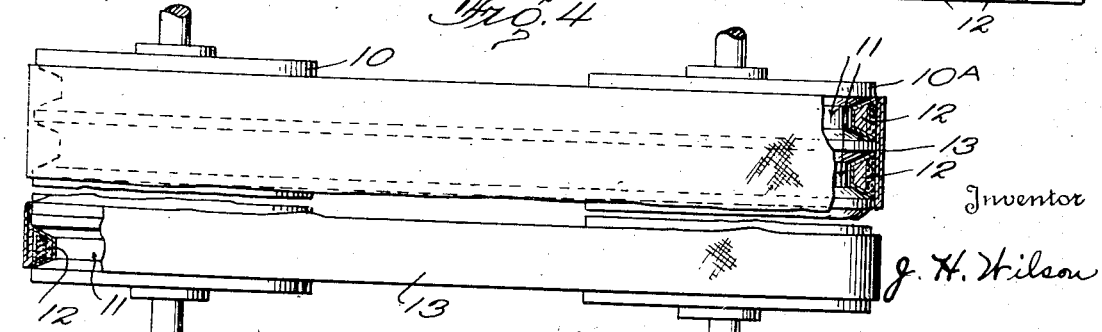
Inventor
J. H. Wilson
By
Watson, Cole, Grindle & Watson
Attorneys Patented Nov. 25, 1941

2,263,960

UNITED STATES PATENT OFFICE 2,263,960

POWER TRANSMISSION BELT

John Hart Wilson, Wichita Falls, Tex.

Application November 16, 1939, Serial No. 304,846

10 Claims. (Cl. 74—233)

The present invention relates to belts for the transmission of power and particularly to power transmission belts of the multiple V-belt type. It has heretofore been suggested that by the use of a plurality of relatively small belts of V-shaped cross-section large amounts of power can be readily and economically transmitted from one grooved pulley to another and the so-called multiple V-belt drive is widely used for communicating power or torque from one shaft to another in the driving mechanisms of numerous types of machines. Each V-belt of a multiple V-belt drive is laterally compressible or distortable, all V-belts of any one drive being fabricated, in the general case, of fabric sheets and cords embedded in soft rubber.

In theory, as is well-known, the several belts of a set of V-belts automatically adjust themselves in the grooves of the pulleys about which they pass, because of their transverse resiliency, the result being that all V-belts of a set are caused to pull equally and the possibility of slippage of one or more belts, and overloading of others, eliminated.

It is frequently found however that, even when the V-belts of a set of such V-belts are identically matched, there will be a tendency for one or more of the belts of the set to whip or vibrate excessively, substantially more than the other belt, or other belts, of the set. While such whipping or vibration is not serious or destructive in itself, nevertheless it sometimes causes one or more belts of a set to eventually turn angularly in the pulley groove or grooves in which normally positioned so that the drive loses part of its effectiveness and one or more belts caused to wear excessively. Likewise a widely vibrating belt may even be caught between an adjacent belt and the pulley around which both belts are passing, with the result that both such belts are immediately destroyed and the drive seriously damaged or rendered inoperative. In accordance with the present invention means is incorporated with a drive of the independent V-belt type the purpose of which is to positively prevent independent whipping or vibration of the belts of the drive and to eliminate the possibility of one or more of the belts of the drive turning or rotating in a pulley groove and to thus lose side driving engagement with the divergent walls of the pulley groove.

These objectives I accomplish by providing a connecting means or web which positively connects two or more V-belts of a drive together in such manner as to prevent whipping and turning of these V-belts but which connecting means does not interfere in any respect with the independent action of the individual V-belts, each belt being left free to accommodate itself by lateral deformation or compression, under tension, to the pulley groove in which it is placed so that the tensions in the several belts of the drive automatically equalize themselves as before. Therefore, the interconnecting means employed in accordance with my invention is of such character that it will take substantially no tension but is relatively stiff in a direction transversely of the drive. Most conveniently the V-belt connecting means may comprise a rubber and fabric band to which two or more V-belts may be secured. Both V-belts and band are continuous and as the V-belts are likewise preferably made of fabric sheets and cords embedded in soft rubber the V-belts may be vulcanized to the band. Advantageously the band may have a base of interwoven threads or cords, including warp threads and cross or woof threads, the warp threads being looped or having slack portions which will merely tend to straighten out when the band is placed under tension but which will not be stretched to such an extent as to become straight or taut and hence placed in substantial tension.

The invention, however, is not limited to the use of any particular kind or type of connecting web or member and, within the import of the invention, any such member which will positively connect two or more V-belts so as to prevent one or more of such belts from whipping relatively to the remainder, or which will prevent any belt or belts from overturning, while at the same time being of such character as to transmit no tensional forces, may be employed.

One embodiment of the invention will be disclosed by way of example but it will be appreciated that numerous modified forms may be employed with different types of drives.

In the drawing, in which a preferred form of the invention is disclosed:

Figure 1 is a partial axial section through a pulley having two belt receiving grooves, V-shaped in transverse section, a belt driving-means of the improved type being shown to be in operative engagement therewith;

Figure 2 is a plan view, partially broken away, of a section of the V-belt connecting band shown in Figure 1;

Figure 3 is a section on line 3—3 of Figure 2; and

Figure 4 shows in plan, partially broken away, a complete power transmission drive including the driving and driven pulleys and the interconnecting flexible V-belt driving means.

Portion of a driving or driven pulley is illustrated in transverse section in Figure 1 and this pulley is shown to be provided with two peripheral outwardly opening V-shaped grooves 11. Within each groove is a V-belt 12, these belts being identical in construction. A very satisfactory type of V-belt heretofore widely employed in a drive of the type described comprises longitudinally extending cords or fabric sheets embedded in relatively soft rubber. The V-belts 12 shown in the drawing by way of example are of the type just described. Each V-belt 12 is connected to a transverse band 13 which band is also fabricated of fibrous material embedded in soft rubber, the inner surface of the band and the outer surfaces of the V-belts 12 being vulcanized together so that the band and the V-belts together comprise one unitary endless driving belt. In Figure 4 it will be observed that the pulley 10 is shown to be connected to the pulley 10A by three or more V-belts interconnected by a single band so as to form one endless flexible driving means. If desired, however, a drive means may be substituted which comprises V-belts arranged in interconnected pairs, or in interconnected groups of three.

The manner in which the connecting band is fabricated may be widely varied but I prefer to employ one fabricated substantially as indicated in the drawing, the band having woof cords 15 disposed as shown in Figures 2 and 3 and one or more longitudinally extending fabric strips 16 disposed to overlie the transversely extending reaches of the groups of woof cords 15 and drooping or sagging downwardly between these groups of woof cords, as shown most clearly in Figure 3. The layers of fabric and the woof cords shown are embedded in soft rubber and it will be perceived that, when the band is subjected to longitudinal tension, it will readily stretch without offering much resistance, the warp fabric simply tending to straighten out but never becoming taut. The woof cords impart some transverse stiffness to the band, the band being sufficiently stiff transversely to maintain the tension elements or V-belts 12 in substantial parallellism at all times. The connecting band 13, and preferably also the V-belts 12 are covered exteriorly with a layer of bias cut lightweight fabric which is readily extensible and offers no resistance to the extension of the connecting band.

It will thus be seen that the band applied to the V-belt drive is of special character, having the capacity to prevent relative whipping or oscillation of the V-belts and preventing any V-belt to which it is attached from turning over, likewise having the capacity to readily flex when passing around pulleys, and to easily stretch longitudinally so that it does not modify in any way the work of the tension elements of the drive, i. e., the V-belts. These V-belts function "independently" insofar as they transmit tensional forces independently of each other and independently of band 13, and accommodate themselves to the grooves in which they are received so as to transmit equal forces, exactly as before. It will be clear to one skilled in the art that other types of connecting bands or V-belts connecting means may be employed, likewise relatively stiff transversely and limp or without material strength longitudinally. That form of connecting band illustrated, however, may be produced economically and may be readily attached to any number of individual V-belts by vulcanization.

Having thus described the invention, what is claimed as new and desired to be obtained by Letters Patent is:

1. A belt for the transmission of power comprising a plurality of V-belts each having oppositely facing side driving surfaces and being elastic so as to be transversely deformable, and longitudinally extensible means connecting said V-belts to prevent whipping or rotation of one V-belt relatively to another, said means freely permitting deformation of the individual V-belts.

2. A belt for the transmission of power comprising a plurality of V-belts each having oppositely facing side driving surfaces and being elastic and transversely deformable, and a flat band bridging said V-belts and to which band each V-belt is secured, said band being freely extensible longitudinally for the purpose set forth.

3. A belt for the transmission of power comprising a plurality of V-belts each having oppositely facing side driving surfaces and being elastic and transversely deformable, and a flat band bridging said V-belts and to which band each V-belt is secured, said band being composed of rubber and fiber and being freely extensible longitudinally.

4. The combination set forth in claim 3 in which both the V-belts and the band are composed of rubber and fabric and are vulcanized together.

5. A belt for the transmission of power comprising a flat band portion and a plurality of V-portions, all such portions being fabricated of fiber and rubber vulcanized together, the V-portions being transversely resilient and the band portion being readily extensible longitudinally.

6. A belt for the transmission of power comprising a flat band portion and a plurality of V-portions, all such portions being fabricated of fiber and rubber vulcanized together, the V-portions being transversely resilient and the band portion being readily extensible so as to take little or no load, while effectively preventing any substantial relative movement of said V-portions transversely of the belt.

7. A belt for the transmission of power comprising a plurality of V-belts each having oppositely facing side driving surfaces and being elastic so as to be transversely deformable, and a longitudinally extensible flexible element to which both V-belts are secured, whipping or rotation of one V-belt relatively to another being prevented by said member.

8. A belt for the transmission of power comprising a plurality of V-belts which are substantially non-extensible and a readily extensible element to which said V-belts are secured, for the purpose set forth.

9. The combination set forth in claim 3 in which the band is composed of a warp which overlies woof cords, both the warp and the woof cords being embedded in rubber.

10. The combination set forth in claim 3 in which the band comprises spaced bundles of woof cords, and a warp disposed thereover, the warp sagging intermediate the bundles of woof cords and both warp and woof being embedded in rubber.

JOHN HART WILSON.